(12) United States Patent
Trevor

(10) Patent No.: US 9,487,428 B2
(45) Date of Patent: Nov. 8, 2016

(54) EASY REMOVAL OF A THIN-WALLED TUBE IN A POWDER-IN-TUBE (PIT) PROCESS

(71) Applicant: OFS Fitel, LLC, Norcross, GA (US)

(72) Inventor: Dennis J Trevor, Clinton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 7 days.

(21) Appl. No.: 14/640,584

(22) Filed: Mar. 6, 2015

(65) Prior Publication Data

US 2016/0257599 A1   Sep. 8, 2016

(51) Int. Cl.
C03B 37/012   (2006.01)

(52) U.S. Cl.
CPC ..... *C03B 37/0128* (2013.01); *C03B 37/01211* (2013.01); *C03B 37/01257* (2013.01); *C03B 2201/02* (2013.01)

(58) Field of Classification Search
CPC ............. C03B 2205/13; C03B 19/00; C03B 2201/58; C03B 2203/42; C03B 37/0122
See application file for complete search history.

(56) References Cited

U.S. PATENT DOCUMENTS

| | | | | |
|---|---|---|---|---|
| 5,212,143 | A * | 5/1993 | Torobin | B01J 13/04 264/129 |
| 5,279,633 | A * | 1/1994 | Fleming | C03B 19/01 65/17.2 |
| 6,128,430 | A * | 10/2000 | Chu | C03B 37/01205 385/141 |
| 6,723,435 | B1 * | 4/2004 | Horne | C03B 37/0128 385/125 |
| 8,132,429 | B2 * | 3/2012 | Pedrido | C03B 37/01211 65/412 |
| 8,720,230 | B2 * | 5/2014 | Sandoz | C03B 37/0122 65/399 |
| 2002/0054741 | A1 * | 5/2002 | Brambilla | C03B 37/01205 385/123 |
| 2004/0050110 | A1 * | 3/2004 | Berkey | C03B 37/01217 65/393 |
| 2005/0244322 | A1 * | 11/2005 | Chen | C01B 33/113 423/335 |
| 2006/0179879 | A1 * | 8/2006 | Ellison | C03B 19/1415 65/17.4 |
| 2007/0214841 | A1 * | 9/2007 | Pedrido | C03B 37/01211 65/477 |
| 2007/0220924 | A1 * | 9/2007 | Pedrido | C03B 37/0122 65/507 |
| 2007/0273055 | A1 * | 11/2007 | Sazio | C03B 19/00 264/1.24 |
| 2010/0000260 | A1 * | 1/2010 | Sandoz | C03B 37/0122 65/399 |
| 2011/0100063 | A1 * | 5/2011 | Desorcie | C03B 37/0124 65/412 |
| 2011/0299824 | A1 * | 12/2011 | Sandoz | C03B 37/0122 385/147 |

* cited by examiner

*Primary Examiner* — Jodi C Franklin
(74) *Attorney, Agent, or Firm* — Sam Han, Esq.

(57) ABSTRACT

The embodiments disclosed herein seek to ameliorate high costs associated with the use of ultra-pure silica by using a lower-cost starting material and purifying the lower-cost starting material to an acceptable level of purity during the preform manufacturing process. In one embodiment, a nucleating compound is coated on a thin-walled silica tube, which upon cooling, forms cristobalite allowing for easy removal of the thin-walled silica tube.

9 Claims, 5 Drawing Sheets

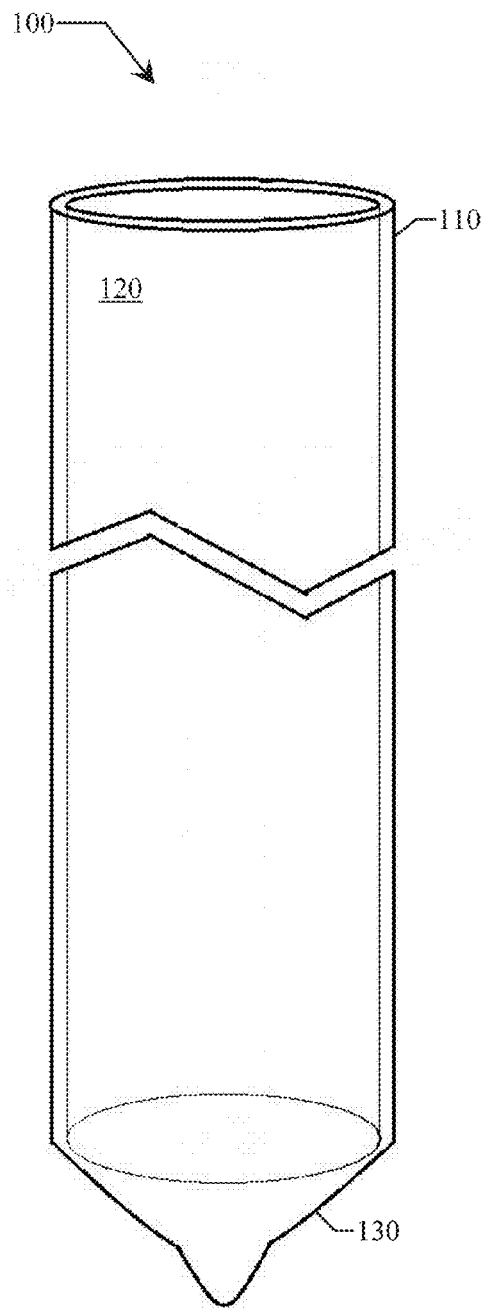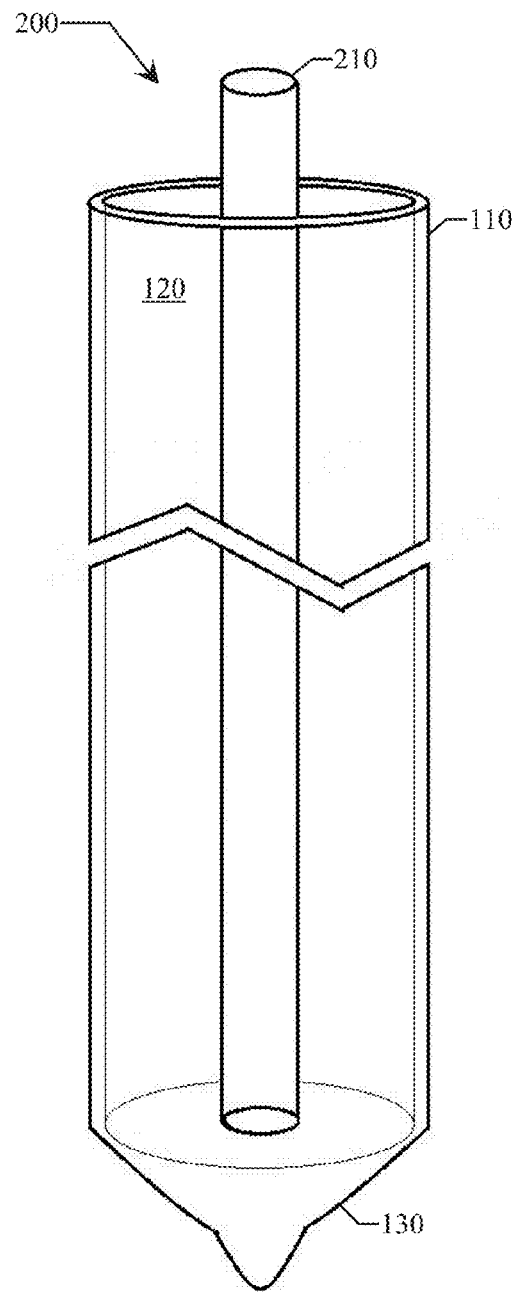
FIG. 1            FIG. 2

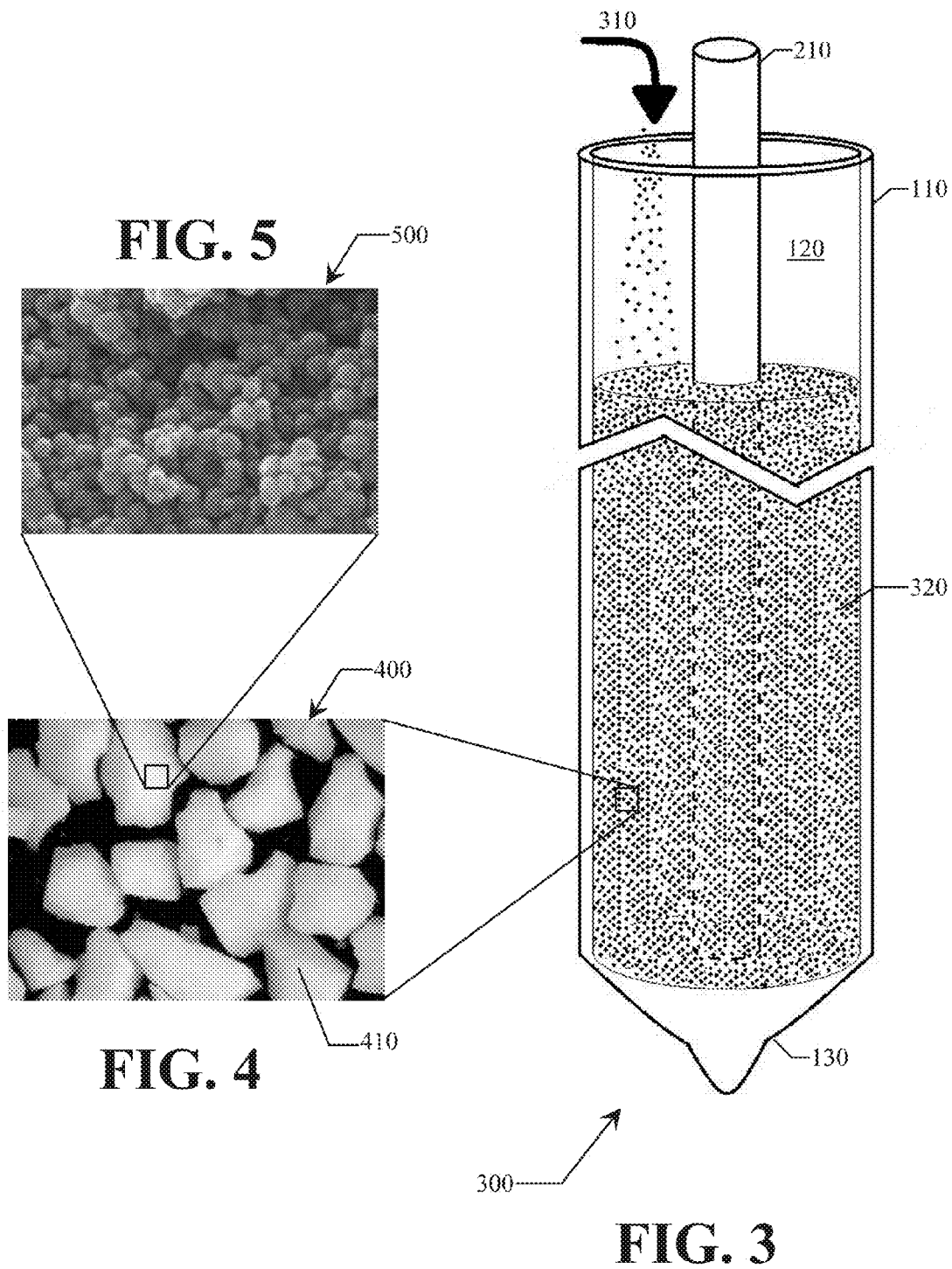

US 9,487,428 B2

EASY REMOVAL OF A THIN-WALLED TUBE IN A POWDER-IN-TUBE (PIT) PROCESS

CROSS REFERENCE TO RELATED APPLICATIONS

This application incorporates by reference the following U.S. patent applications, which are filed concurrently with this application:

U.S. patent application Ser. No. 14/640,615, having the title "Manufacturing Irregular-Shaped Preforms";

U.S. patent application Ser. No. 14/640,649, having the title "Using Porous Grains in Powder-in-Tube (PIT) Process";

U.S. patent application Ser. No. 14/640,531, having the title "Using Silicon Tetrafluoride in Powder-in-Tube (PIT) Process."

BACKGROUND

1. Field of the Disclosure

The present disclosure relates generally to manufacturing and, more particularly, to manufacturing preforms.

2. Description of Related Art

Optical fiber preforms possess properties that determine the characteristics of optical fibers that are eventually drawn from those preforms. The quality of an optical fiber correlates with the quality of materials that are used in manufacturing the preform from which the optical fiber is drawn. As one can imagine, using higher-quality starting materials results in increased costs. In view of this, there are ongoing efforts to reduce the manufacturing costs of the preforms, and concurrently to improve the quality of the preforms.

SUMMARY

Disclosed herein are various embodiments of systems and processes that employ porous silica grain in a preform manufacturing process. In some embodiments, the porous silica grains are purified, sintered, and consolidated.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 shows an empty silica tube that has been sealed at the bottom.

FIG. 2 shows a core rod placed within the silica tube of FIG. 1.

FIG. 3 shows the silica tube of FIG. 2 being filled with silica grains.

FIG. 4 shows an enlarged view of the silica grains of FIG. 3.

FIG. 5 shows a mesoporous structure of one of the silica grains of FIG. 4.

DETAILED DESCRIPTION OF THE EMBODIMENTS

Figure 6:
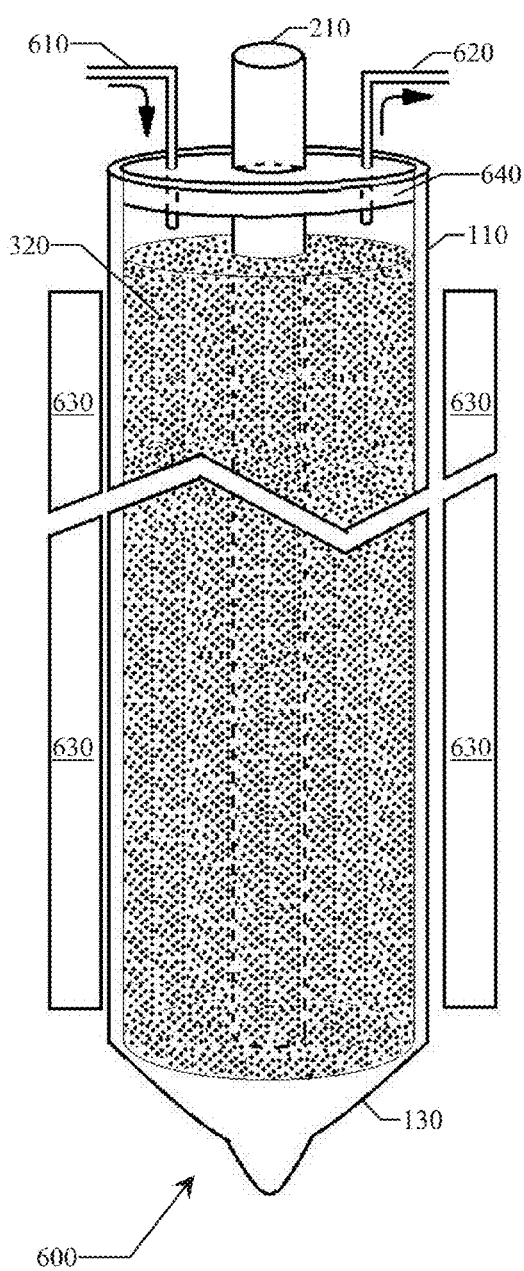
FIG. 6 shows a purification process being applied after the silica-grain-filling process of FIG. 3.

Currently, optical fibers are designed with very stringent specifications in optical performance, mechanical strength, physical dimensions, and reliability. With increasing demands for bandwidth, these specifications continue to become increasingly stringent. In order for optical fibers to meet such stringent specifications, manufacturers employ exacting controls over the manufacturing process. While strict controls over the process contribute to the fiber quality, another factor that affects the quality of the fiber is the quality of the starting materials that are used to manufacture the optical fiber preforms from which the fibers are drawn. For example, if a preform contains impurities or defects, then those imperfections can result in degraded performance. Specifically, surface contamination and refractory particles, which act as stress centers during the fiber drawing process, affect the mechanical properties of optical fibers and contribute to fiber breakage. As such, much effort is devoted to using high-purity starting materials with minimal contaminants.

In one preform manufacturing process, known as a powder-in-tube (PIT) process, a silica tube is filled with silica powder and consolidated at high temperatures in the presence of a vacuum, thereby resulting in an optical fiber preform. Because conventional PIT processes typically use fully densified silica crystals, any refractory particle that is trapped within those densified crystals becomes a part of the preform. Consequently, those trapped refractory particles degrade the mechanical properties of the optical fiber that is eventually drawn from the preform. Thus, in order produce industrially-acceptable preforms, the conventional PIT processes use ultra-pure silica powder. In other words, because the resulting optical fiber inherits the impurities in the silica powder in conventional PIT processes, those processes strive to use silica of the highest purity as the starting materials. Unfortunately, ultra-pure silica is expensive. Hence, the cost of the resulting fiber is directly traceable to the cost of the silica starting materials.

The embodiments disclosed herein seek to ameliorate the high costs associated with the use of ultra-pure silica by using a lower-cost starting material and purifying the lower-cost starting material to an acceptable level of purity during the preform manufacturing process. In one embodiment, instead of using fully densified silica crystals, the disclosed processes use porous silica grains that have a substantially monodisperse size distribution. Stated differently, porous silica grains with substantially uniform grain size are used as the starting materials for the disclosed PIT processes. In one preferred embodiment, 150-micrometer-size porous silica grains are used as the particular starting material. Preferably, the porous silica grains are mesoporous silica grains having a pore size of between approximately two (2) nanometers (nm) and fifty (50) nm. However, it should be appreciated that larger or smaller pore sizes will also work in the disclosed processes and systems.

To the extent that pores in the mesoporous silica grains are connected to the surface of the grains, the connected porosity provides a mechanism that allows impurities that are smaller than the pore size to diffuse to the surface of the silica grain, thereby permitting purification of the mesoporous silica grains. Since the mesoporous structure permits purification, unlike the fully densified silica crystals, the disclosed PIT process is not as restricted to the use of ultra-high-purity silica that is typically required for conventional PIT processes. Thus, the disclosed PIT process results in cost reductions that are typically not achievable in conventional processes for similar quality optical fiber preforms. Additionally, the porosity of the mesoporous silica permits doping during the PIT process. And, since the mesoporous silica has a higher surface-to-volume ratio than fully densified silica, the temperature at which the mesoporous silica softens is lower than the temperature at which the silica tube softens. For this reason, the mesoporous silica can be sintered concurrently with the consolidation of the silica tube. The ability to sinter and consolidate in a single step further reduces costs because only one high-temperature step is needed to accomplish both sintering and consolidation.

As described in greater detail herein, using substantially homogeneous mesoporous silica grains provides a more economical approach to manufacturing optical fiber preform. Having provided an overview of several embodiments, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Generally, FIGS. 1 through 9 illustrate several embodiments of the inventive PIT preform-fabrication process, and FIGS. 4 and 5 show the structure of mesoporous silica grains with a substantially monodisperse size distribution (or uniform grain size), which are used as the starting materials for the disclosed PIT processes. Also, with reference to FIGS. 4 and 5, a sol-gel process for manufacturing mesoporous silica having substantially-uniform grain sizes is discussed.

FIG. 1 shows one embodiment of a hollow tube 100 that is used in a powder-in-tube (PIT) preform manufacturing process. As shown in the embodiment of FIG. 1, the hollow tube 100 is a silica tube 110 with a cavity 120 and a sealed bottom 130. This silica tube 110 is preferably fabricated from fused quartz. The quality of the silica tube 110 can vary, depending on whether the glass from the silica tube 110 that eventually becomes a part of the preform will be removed by etching or machining. For illustrative purposes, the silica tube 110 described herein is a thin-walled tube that is approximately 1.2 meters (m) in length with a wall thickness of approximately 7 millimeters (mm). Experiments have been successfully conducted using thin-walled tubes that have inner diameters that ranged from approximately 35 mm to approximately 90 mm. While these dimensions are provided to more clearly illustrate one embodiment of a PIT process, it should be appreciated that the dimensions of the silica tube 110 may be modified based on the manufacturing tolerances and preferences.

As previously described, the glass from the silica tube 110 may become a part of the preform or may be removed by etching or machining Only silica tubes that are high purity will become part of the preform. While this removes the need for machining or etching, the use of high purity silica tubes significantly increases the cost of the preform. Thus, the use of a low quality tube to confine the mesoporous silica is often preferred, despite the additional step of removing the silica tube 110. With this in mind, the embodiments shown herein disclose a thin-walled tube comprising a layer of cristobalite, which allows for a reduced amount of machining or etching to remove a low-quality thin walled tube from the preform, thereby resulting in significant time-, energy-, and cost-savings.

In some embodiments, the hollow tube 100, which is preferably made from low quality silica, is coated with compounds that promote nucleation and growth of cristobalite. Non-limiting examples of such compounds are aluminum (Al) containing salts and other ions such as calcium (Ca), barium (Ba), and magnesium (Mg). The coating may be applied to the inside of the hollow tube 100. Alternatively, the coating may be applied to the outside of the hollow tube 100. As described in greater detail below, the cristobalite becomes relevant as the final preform is cooled.

FIG. 2 shows a tube-and-core-rod setup 200, where a core rod 210 placed within the silica tube 110. Placing the core rod 210 in the silica tube 110, as shown in FIG. 2, permits manufacturing of optical fiber preforms that can be drawn into an optical fiber. Conversely, a thin-walled silica tube 110 without a core rod, as shown in FIG. 1, can be used in the manufacturing of silica jackets that can be used in, for example, a rod-in-tube process. For illustrative purposes, the PIT processes described herein are implemented using the tube-and-core-rod setup 200. However, it should be appreciated that similar PIT processes can be implemented with the hollow tube 100 in the absence of the core rod.

With the starting tubes and configurations of FIGS. 1 and 2 in mind, attention is turned to FIG. 3, which shows a tube-filling setup 300, where the silica tube 110 of FIG. 2 is filled with silica grains 310. As shown in FIG. 3, the thin-walled silica tube 110 has a sealed bottom 130, which permits filling of the cavity 120 from the top of the silica tube 110. Since the embodiment of FIG. 3 includes a core rod 210, entering silica grain 310 fills the space in the silica tube 110 surrounding the core rod 210, and the silica grain 320 accumulates from the bottom upward. For some embodiments, a mild mechanical disruption can be introduced during the filling process to permit the settled silica grains 320 to achieve a random-close-packed density. The resulting configuration is random-close-packed silica grains (or powder) 320 in the silica tube 110, and hence the name powder-in-tube (PIT).

Unlike conventional PIT processes that use fused quartz silica grains, the tube-filling setup of FIG. 3 uses mesoporous silica grains 410, which are shown in greater detail in enlarged view 400 of FIG. 4. In one preferred embodiment, the mesoporous silica grains 410 have a substantially monodisperse size distribution, meaning that the mesoporous silica grains 410 have a substantially uniform (or homogeneous) grain size. Since the purification time for the mesoporous silica grains 410 is directly proportional to the diffusion length of the contaminants that are being purged, a larger grain size results in a longer purification time, while a smaller grain size results in a correspondingly-shorter purification time. Also, if faster sintering is desired, then a smaller grain sizes are preferable, since smaller particles sinter faster than larger particles. In one preferred embodiment, approximately-150-micron-size mesoporous silica grains 410 are used as the starting materials for the disclosed PIT processes. However, it should be appreciated that the grain size can be varied as desired, with a preferred grain size being between approximately 25 microns and 250 microns.

It is worthwhile to note is that the random-close-packed density is the same irrespective of the grain size, as long as the grains are substantially homogeneous. As such, whether the grains are uniformly 25 microns, 70 microns, 150 microns, or 250 microns, as long as the size distribution is monodisperse, the packing density is substantially the same.

One way of manufacturing the substantially homogeneous mesoporous silica grains 320 is by using a sol-gel process. Since sol-gel processes are well-known in the art, only a truncated discussion of the process is provided herein to properly frame the inventive PIT processes. Within the sol-gel process, fumed silica is dispersed in water using an appropriately-small quantity of tetramethyl ammonium hydroxide. This dispersion is mixed under high-shear conditions and then centrifuged to remove particulates of higher density, typically comprising metals, metal oxides, and large particulates of comparable density, usually of incompletely dispersed silica agglomerates. The mixture is filtered once again, but this time to remove dissolved gases and bubbles. Thereafter, the mixture is aged and dried, which results in a mesoporous silica cake. And, it is from this mesoporous silica cake that the mesoporous silica grains 320 are derived. Specifically, the dried cake is crushed and ground into a desired uniform grain size (e.g., 150-micron-size grains). At this point, the impurities in the dried gel include comparable masses of water and organic species (a few percent by weight of each), a fraction of a percent surface hydroxyl, and parts-per-million (ppm) levels of metals and metal oxides. In other words, at this point, the mesoporous silica grains 320 still have impurities. However, as discussed below, those impurities can be removed during the disclosed PIT process.

A closer examination of the pore structures is helpful in understanding the purification mechanism in the disclosed PIT process. For this reason, FIG. 5 shows a pore structure 500 of one of the mesoporous silica grains 410. As shown in FIG. 5, the pores in the mesoporous silica grains 410 are connected to the surface of the grains. The connected porosity of the pore structure 500 provides a mechanism that allows impurities that are smaller than the pore size to diffuse to the surface of the silica grain. As noted earlier, if the grain size is sufficiently small to permit implementation of diffusion-based purification processes, then the mesoporous silica grains 410 can be purified during the PIT process, thereby ameliorating the need for ultra-pure silica as the starting materials. In other words, since the mesoporous structure permits purification, unlike the fully densified silica crystals in conventional PIT processes, the disclosed mesoporous structure results in a cost reduction when compared to the use of fully densified silica grain.

With this in mind, attention is turned to FIG. 6, which shows a purification setup 600 that is used to purify the mesoporous silica grains 320 that have filled the silica tube 110, as shown in FIG. 3. In the configuration of FIG. 6, an upper seal 640 is placed on the thin-walled silica tube 110, which, in conjunction with the sealed bottom 130, creates a closed environment within the silica tube 110. The mesoporous silica grains 320 are held within the closed environment. The upper seal 640 comprises an output vent 620, through which the remaining water, organic species, surface hydroxyl, metals, and metal oxides are expelled from the closed environment. Also provided through the upper seal is an input port 610 through which chlorine, nitrogen, thionyl chloride, and air are introduced into the closed environment. The purification setup 600 also includes a heating element 630 (e.g., torch or furnace) that is used in the purification process.

Before discussing the purification process, it is worthwhile to note another advantage of using mesoporous silica grains 320 with the input port 610 and output vent 620. Namely, the pore structure 500 permits doping during the PIT process, and the input port 610 provides a mechanism by which dopants can be introduced to the mesoporous silica grains 320. As one can see, the output vent 620 expels excess dopants and permits regulation of pressure within the closed environment.

As for the purification process, in operation, once the mesoporous silica grains 320 are packed in the thin-walled tube 110, the purification setup 600 is heated to approximately 600 degrees Celsius (° C.) to remove residual water and organic species in an anaerobic environment followed by an oxidizing environment. Since those compounds are trapped in a mesoporous material 500, the heat causes those impurities to diffuse to the surface of the mesoporous silica grain 410 for eventual evacuation through the output vent. Since 600° C. is well below the melting point of silica, the mesoporous silica material 500 maintains its shape during this evacuation process.

Once the water and organic species are removed, chlorine is introduced into the closed environment through the input port 610, and the temperature of the heating element is raised to approximately 900° C. At this temperature, the remaining water that is chemically bonded with the silica now reacts with the chlorine, thereby resulting in the dehydroxilation of the silica. The byproducts from the dehydroxilation process are expelled through the output vent 620.

In the next purification step, metal and metal oxide refractories (such as zirconia and chromia) are removed in a nitrogen environment by introducing thionyl chloride into the closed environment via the input port 610, and increasing the temperature of the heating element 630 to approximately 1250° C. The purification process yields a fully dehydroxilated, high-purity, mesoporous silica grain 320, which is ready for sintering and consolidation, which are discussed in greater detail with reference to FIGS. 7 and 8.

Before discussing the sintering and consolidating process, attention is turned to the coating that was applied to promote nucleation and growth of cristobalite. As the temperature is increased to greater than approximately 1100° C., preferably approximately 1470° C., de-vitrified silica in the hollow tube 100 will be converted to α-cristobalite. The presence of α-cristobalite becomes relevant later in the process, as described with reference to FIG. 9.

Figure 7:
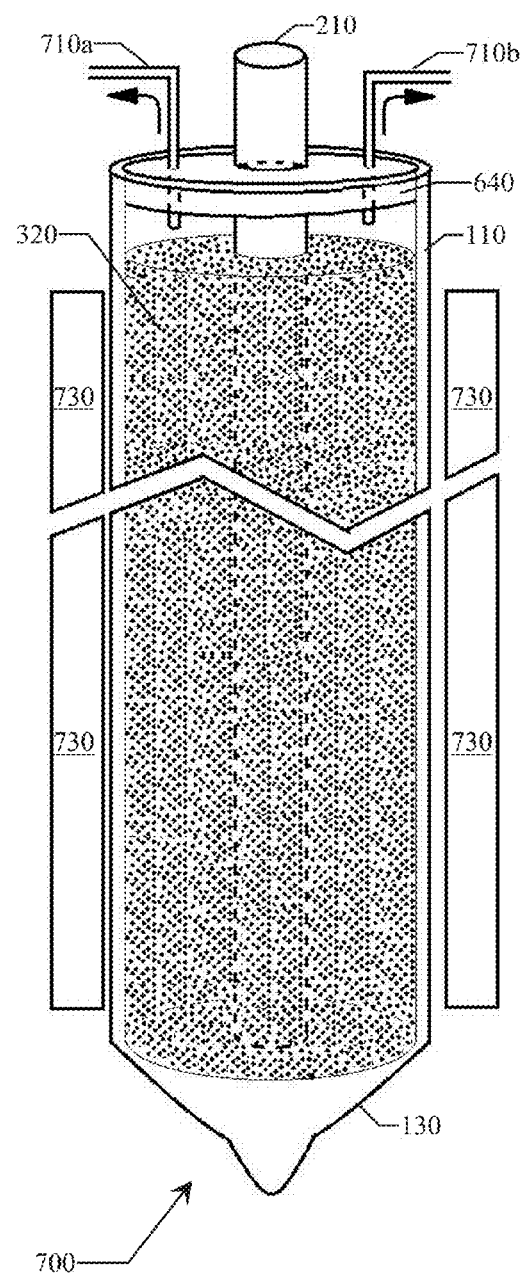
FIG. 7 shows a vacuum being applied to the silica-grain-filled tube after the purification process shown in FIG. 6.

FIG. 7 shows a vacuum application setup 700 in which a vacuum is applied to the silica-grain-filled tube. The input port 620 (FIG. 6) and the output vent 620 (FIG. 6) now serve as vacuum ports 710a, 710b (collectively 710), through which a vacuum is drawn, thereby reducing the pressure within the silica tube 110. Here, the upper seal 640 and the sealed bottom 130 provide a closed environment, thereby allowing for depressurization through the two vacuum ports 710. Since the mesoporous silica has a higher surface-to-volume ratio than fully densified silica, by drawing a vacuum within the silica tube 110, the consolidation temperature of the mesoporous silica grains 320 is lower than the temperature at which the silica tube softens. Thus, by increasing the heating elements 730 to approximately 1735° C. while drawing a vacuum, the mesoporous silica grains 320 can be sintered before the fully densified silica tube 110 reaches its melting point.

Figure 8:
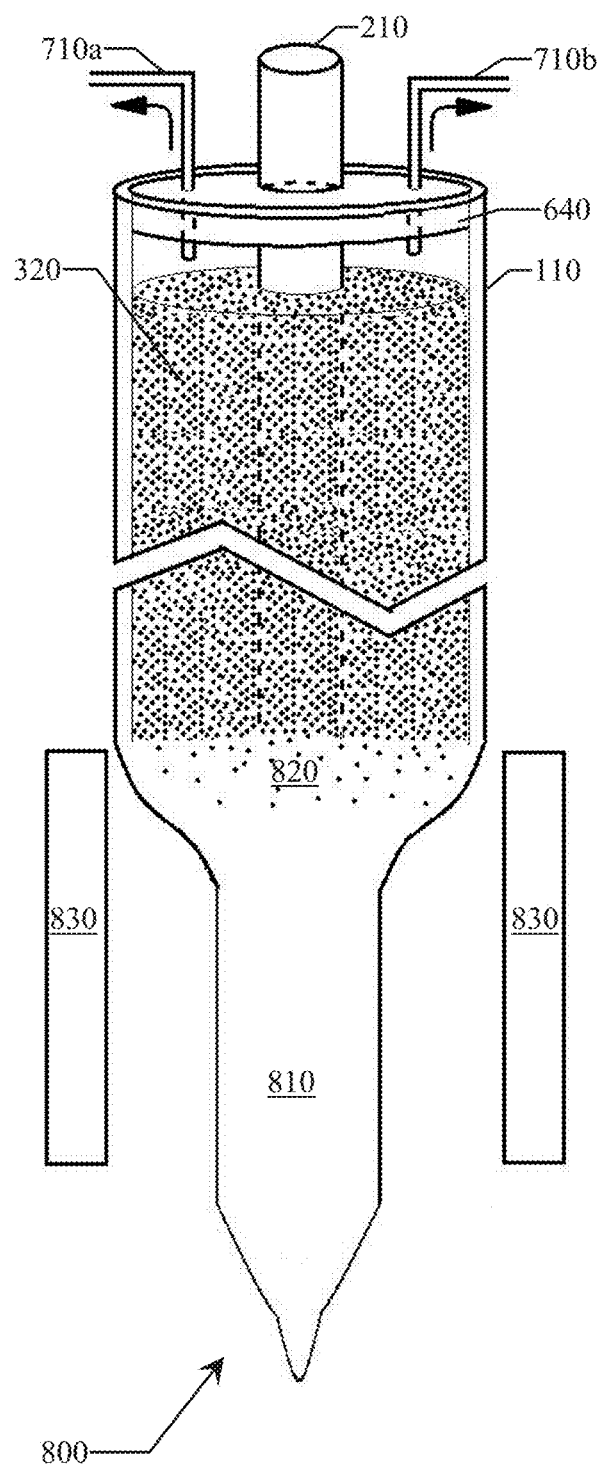
FIG. 8 shows sintering and condensation of the silica-grain-filled tube in the presence of the vacuum applied in FIG. 7.

As shown in FIG. 8, given the proper combination of high temperatures and vacuum, the mesoporous silica grains 320 sinters 820 substantially concurrently with the consolidation of the silica tube 110. This results in a high-purity, fully-densified silica body 810. This ability to sinter and consolidate in a single step further reduces costs, because only one high-temperature step is needed to accomplish both sintering and consolidation.

After the silica tube 110 has consolidated around the sintered glass body, the preform is allowed to cool. At this point in time, there exists a layer of α-cristobalite on the preform due to the coating, described above. The α-cristobalite further contributes to efficiencies in preform manufacturing, as long as the α-cristobalite is not vitrified during the PIT process.

Once the layer is cooled to below between approximately 220° C. to approximately 280° C., the α-cristobalite undergoes a phase transition to β-cristobalite. Upon an α-β phase transition, the cristobalite layer 900 becomes opaque and white in color. Moreover, β-cristobalite has a significantly greater density than α-cristobalite and will heavily crack upon the α-β phase transition.

Figure 9:
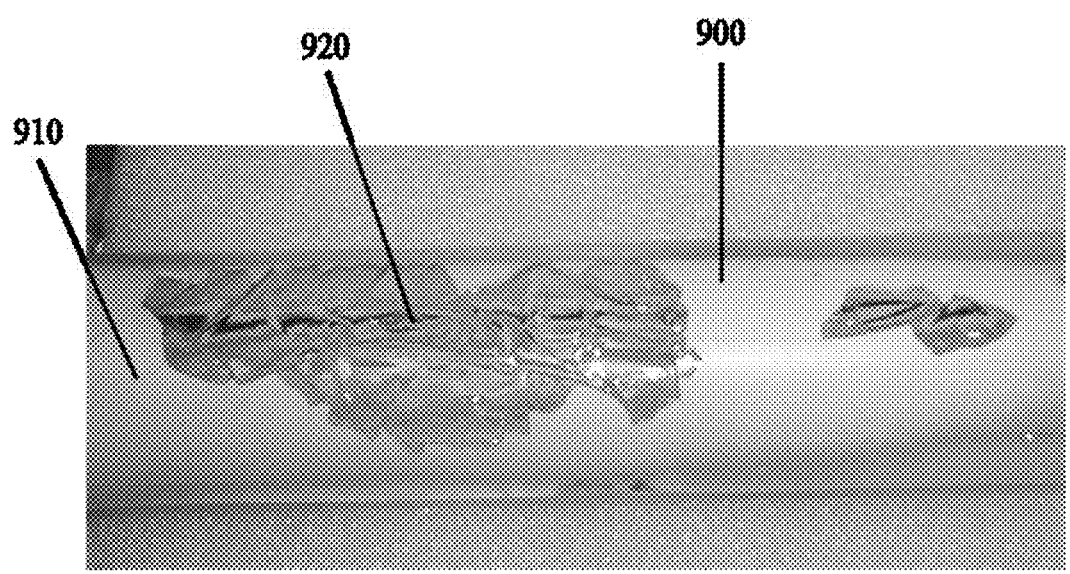
FIG. 9 shows an embodiment of a hollow tube with a cristobalite layer after $\alpha$-$\beta$ phase transition.

With this in mind attention is turned to FIG. 9, which shows an embodiment of a hollow tube with a cristobalite layer after the α-β phase transition. Due to the heavy cracking, the β-cristobalite 900, which was formed on the hollow tube 100 can then be easily broken away from vitreous material 910 (such as unconverted portions of the hollow tube 100 and the preform) in layers that are a few millimeters thick. This results in almost complete removal of the hollow tube 100, with only residual fragments remaining for removal by machining or etching. And, as one can appreciate, by creating a break-away outer layer, there is less material to remove by grinding or etching.

The embodiments disclosed herein seek to ameliorate the high costs associated with the use of ultra-pure silica by using a lower-cost starting material and purifying the lower-cost starting material to an acceptable level of purity during the preform manufacturing process. In one embodiment, instead of using fully densified silica crystals, the disclosed processes use mesoporous silica grains that have a substantially monodisperse size distribution. Stated differently, mesoporous silica grains with substantially uniform grain size are used as the starting materials for the disclosed PIT processes. In one preferred embodiment, 150-micrometer-size mesoporous silica grains are used as the particular starting material.

As described with reference to FIGS. 1 through 8, the use of mesoporous silica grains 320 permits the application of purification processes that cannot be applied to fully densified silica crystals. Thus, the disclosed PIT process is not as restricted to the use of ultra-high-purity silica that is typically required for conventional PIT processes. Consequently, the disclosed PIT process provides a cost reduction that is typically not achievable in conventional processes for similar quality optical fiber preforms. Additionally, the porosity of the mesoporous silica 500 permits doping during the PIT process, concurrent sintering of the mesoporous silica grains 320 with the consolidation of the silica tube 110, and further cost reductions by using a single high-temperature sintering-and-consolidation step. Ultimately, the use of mesoporous silica grains 320 as the starting material for the disclosed PIT process no longer requires the manufacturer to use the highest-purity starting materials for preform fabrication but, rather, allows a lower-cost material to be purified to the necessary specifications, thereby reducing a large portion of the manufacturing costs.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. For example, it should be appreciated that the term mesoporous means a porous structure in which the pores are connected to the surface of the grain. All such changes, modifications, and alterations should therefore be seen as within the scope of the disclosure.

What is claimed is:

1. A powder-in-tube preform manufacturing process, comprising:
    sealing a bottom of a thin-walled silica tube, the silica tube having a wall thickness of approximately 7 millimeters (mm), the silica tube having an inner diameter that is between approximately 35 mm to approximately 90 mm, the silica tube having a tube length of approximately 1.2 meters (m);
    inserting a core rod into the silica tube, the inserted core rod being substantially centered within the silica tube;
    coating the silica tube with a layer of a nucleating compound selected from the group consisting of: aluminum containing salts, calcium, magnesium, and barium;
    filling the silica tube with mesoporous silica grains, the mesoporous silica grains being substantially monodisperse in size;
    applying a vapor-phase purification process to the mesoporous silica grains, the vapor-phase purification process being applied at a temperature that is less than approximately 1300 degrees Celsius (° C.);
    applying a vacuum to the silica tube to decrease the pressure within the silica tube;
    sintering the mesoporous silica grains in the presence of the vacuum and at a temperature that is greater than approximately 1000° C.;
    consolidating the silica tube to form a preform; and
    cooling the preform to below approximately 280° C.

2. The process of claim 1, the size of the mesoporous silica grains being between approximately 25 microns and approximately 250 microns.

3. The process of claim 2, the size of the mesoporous silica grains being approximately 150 microns.

4. A preform manufacturing process, comprising:
    coating a silica tube with a nucleating compound;
    filling the silica tube with silica grains;
    applying a vapor-phase purification process to the silica grains;
    forming an α-cristobalite layer on the silica tube from the nucleating compound;
    sintering the silica grains;
    consolidating the silica tube to form a preform; and
    cooling the preform to convert the α-cristobalite into β-cristobalite.

5. The process of claim 4, the silica grains being substantially homogeneous mesoporous silica grains.

6. The process of claim 5, the mesoporous silica grains having a grain size of approximately 150 microns.

7. The process of claim 4, the silica grains comprising an ultra-pure silica powder.

8. The process of claim 4, the nucleating compound being selected from the group consisting of: aluminum containing salts, calcium, magnesium, and barium.

9. The process of claim 4, the silica tube comprising low-quality silica.

* * * * *